United States Patent [19]

Steiger

[11] 4,287,961
[45] Sep. 8, 1981

[54] VARIABLE CAPACITY RADIATOR SYSTEM FOR OFF-HIGHWAY VEHICLES

[75] Inventor: Bruce W. Steiger, Thief River Falls, Minn.

[73] Assignee: Hydra-Mac, Inc., Thief River Falls, Minn.

[21] Appl. No.: 83,545

[22] Filed: Oct. 10, 1979

[51] Int. Cl.³ ............................................. B60K 11/04
[52] U.S. Cl. ............................... 180/68 R; 123/41.43; 123/41.51; 165/137
[58] Field of Search .................. 180/69 R, 68 R, 68 P; 165/51, 137, 144; 123/41.51, 41.43

[56] References Cited

U.S. PATENT DOCUMENTS

| 2,184,657 | 12/1939 | Young | 165/137 |
|---|---|---|---|
| 3,754,596 | 8/1973 | Ward | 165/137 |
| 3,834,478 | 9/1974 | Alexander et al. | 180/68 P |
| 3,938,586 | 2/1976 | Barlow | 180/68 R |
| 3,970,164 | 7/1976 | Suzuki | 180/68 R |

FOREIGN PATENT DOCUMENTS

| K 24065 | 10/1955 | Fed. Rep. of Germany | 180/68 R |
|---|---|---|---|
| 397786 | 8/1933 | United Kingdom | 180/68 R |

*Primary Examiner*—David M. Mitchell
*Attorney, Agent, or Firm*—Williamson, Bains, Moore & Hansen

[57] ABSTRACT

An off-highway vehicle includes a body having an engine compartment in which is positioned an internal combustion engine. The grill for the engine compartment is hinged to the body to permit ready access to the engine compartment. The radiator system for the engine includes a plurality of similar cooling modules which are interconnected together and to the engine to circulate coolant with respect to the engine. The number of cooling modules may be readily varied to vary the cooling capacity of the radiator system.

5 Claims, 3 Drawing Figures

VARIABLE CAPACITY RADIATOR SYSTEM FOR OFF-HIGHWAY VEHICLES

SUMMARY OF THE INVENTION

This invention relates to a variable capacity radiator system for off-highway vehicles.

Many kinds of off-highway vehicles, such as front-end loaders and the like, have widespread utility and are used in various ways and in various places. Most of the off-highway vehicles employ internal combustion engines which are typically cooled by a liquid coolant circulated through a radiator system. However, conditions under which the off-highway vehicles operate affect the cooling requirements of the radiator system. For example, a front-end loader operating in a foundry during the summer months would require more cooling capacity than the same vehicle operating outdoors during the winter months. However, in most off-highway vehicles, there is no provision for varying the cooling capacity of the radiator system.

It is therefore a general object of this invention to provide an off-highway vehicle with a variable capacity radiator system which is of simple and inexpensive construction.

A more specific object of this invention is to provide a variable capacity radiator system for internal combustion engines for off-highway vehicles in which the cooling modules of the radiator system may be readily removed or added to vary the cooling capacity of the radiator system.

These and other objects and advantages of this invention will more fully appear from the following description made in connection with the accompanying drawings, wherein like reference characters refer to the same or similar parts throughout the several views.

FIGURES OF THE DRAWINGS

DESCRIPTION OF THE PREFERRED EMBODIMENT OF THE INVENTION

Figure 1:
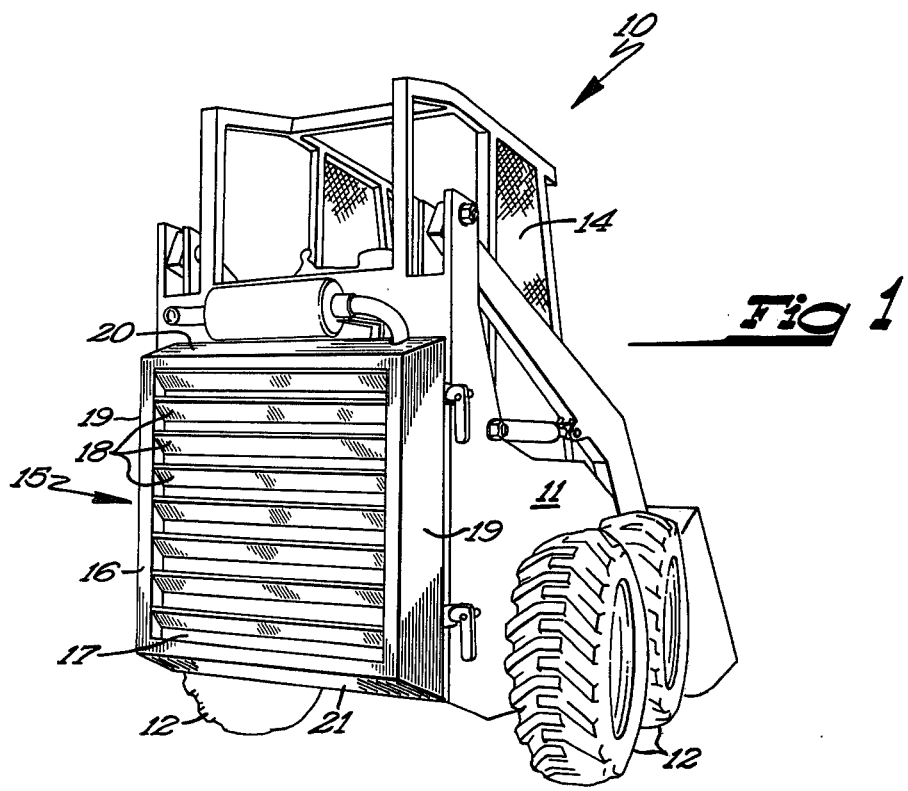
FIG. 1 is a rear perspective view of a skid steer loader incorporating the novel variable capacity radiator system.
Figure 2:
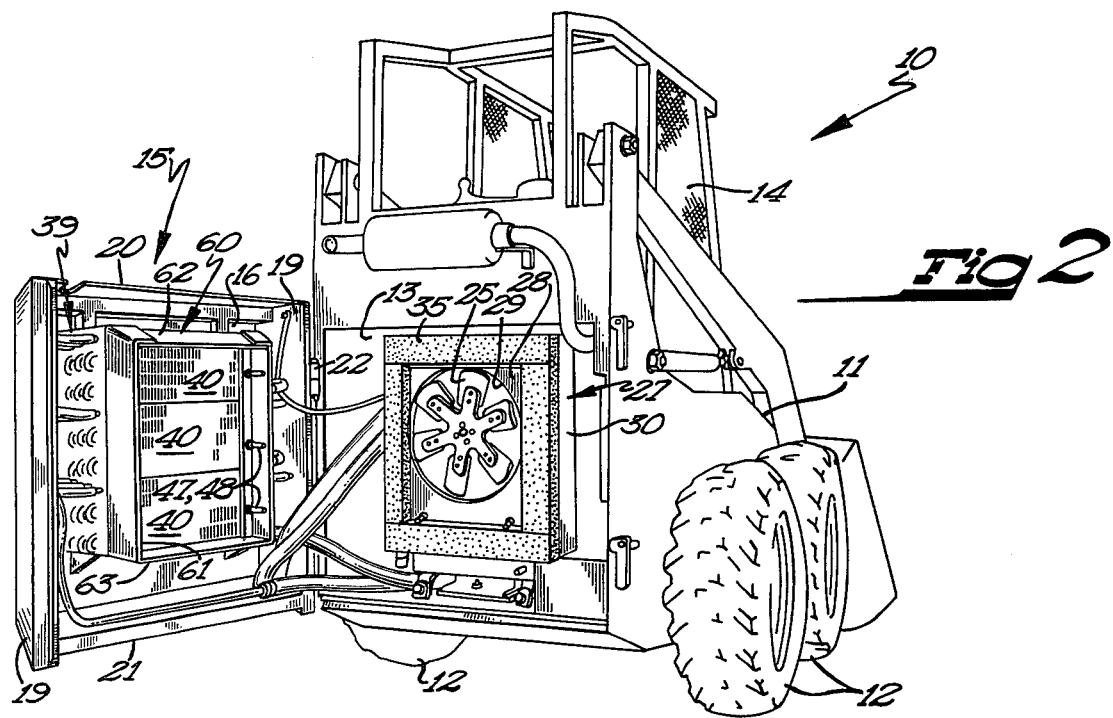
FIG. 2 is a rear elevational view of the skid steer loader with the grill housing illustrated in the open condition.

Referring now to the drawings, and more particularly to FIG. 1, it will be seen that one embodiment of an off-highway vehicle is there shown. In this regard, the off-highway vehicle illustrated is a skid steer loader vehicle, designated generally by the reference numeral 10. The vehicle 10 includes a vehicle body 11 provided with propulsion wheels 12 for propelling the vehicle along the surface of the ground. The vehicle body is provided with an engine compartment 13 at its rear end and an operator's space 14 at its front. The engine space 13 opens rearwardly and is closed by a rear grill or closure housing 15.

The rear grill housing 15 includes a substantially flat vertically disposed rear wall 16 having a generally rectangular shape opening 17 therein. Transverse bars 18 extend across the opening 17 but are spaced apart to permit air to flow therebetween. The rear grill housing 15 also includes generally vertically disposed vertical sidewalls 19, a transverse upper wall 20 and a transverse lower wall 21. A hinge 22 hingedly connects the rear grill housing along one of the vertical side walls to the rear end portion of the body 11 to permit fore and aft swinging of the rear grill housing about a substantially vertical axis between open and closed positions.

The engine compartment 13 accommodates a conventional internal combustion engine 23 therein which provides power through a hydrostatic drive to propulsion wheels 12 and to the front-end loader implement. The internal combustion engine 23 is provided with a cooling block 24 and is also provided with a cooling fan 25 whose shaft 26 is driven from the crankshaft of the engine 23. The fan 26 is mounted in a fan housing 27 which is mounted in the engine space 13 adjacent the rear thereof and which includes a vertically disposed rear wall 28 having a circular opening 29 therein.

The fan housing 27 also includes vertically disposed side walls 30, a transverse top wall 31 and a transverse bottom wall 32. The rear surface of the rear wall 28 is provided with a transverse flange 33 which is spaced below the top wall 31 and which is integral with a pair of spaced apart vertical flanges 34. It will be noted that the vertical flanges 34 are spaced inwardly from the side walls 30 of the fan housing. A generally rectangular arranged foam gasket 35 is secured to the fan housing and is positioned around the transverse flange 33 and vertical flanges 34.

The internal combustion engine 33 is cooled by conventional liquid coolant such as water or a mixture of an anti-freeze solution and water which is circulated between a variable capacity radiator system, the engine block and a reservoir tank 36. The reservoir tank 36 has an outlet 37 to which is connected a conduit 38, the conduit 38 also being connected to the engine block 24 to permit cooled coolant to be returned from the reservoir tank to the engine block. It will be noted that the reservoir tank 36 can be incorporated with either the upper manifold pipe 52 that supplies water to the radiator cores 40 or a lower manifold header as the water flows out the radiator cores.

The heated coolant from the cooling block 24 is circulated through the novel variable capacitor radiator system 39 before it is returned to the reservoir tank 36 and thereafter to the cooling block 24. The novel radiator system 39 is comprised of a plurality of similar rectangular shaped radiator cores or modules 40 each having a plurality of spaced apart vertically arranged cooling fins 40a. Each of the radiator modules 40 is provided with generally rectangular shaped flat end plates 41, each end plate having a plurality of U-shaped connector elements integral therewith and projecting laterally outwardly therefrom. In the embodiment shown, the radiator modules are arranged in upper and lower pairs, and are also arranged in fore and aft stacked relation. The orientation of radiator modules can be designed to either be horizontal as illustrated or vertical. Orientation is dictated by configuration of vehicle body 11 and rear grill 15.

Figure 3:
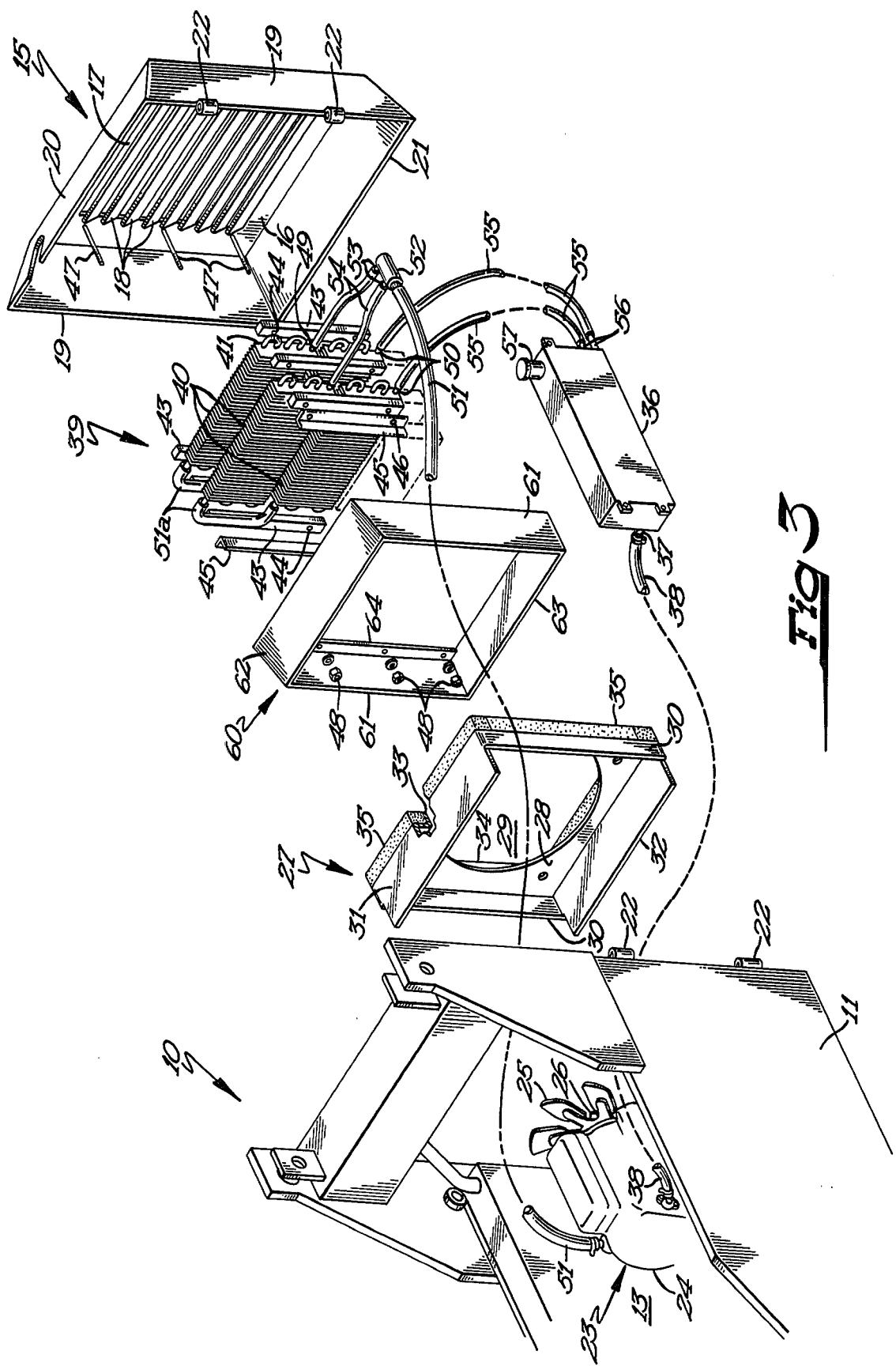
FIG. 3 is an exploded rear perspective view illustrating the various components of the variable capacity radiator system incorporated in the skid steer loader.

In this regard, the radiator modules are mounted on the grill housing 15 and each upper and lower pair of modules is spaced from the next adjacent pair by vertical spacer bars 43 having apertures 44 therethrough. Bolts or studs 47 secured to the rear grill housing 15 pass through the U-shaped connector elements on the radiator modules and through the apertures 44 in the vertical spacer bars and finally through apertures 46 in vertically disposed angle shaped mounting brackets 45 as best seen in FIG. 3. The bolts 47 also secure a radiator shroud 60 to the rear grill housing 15. In this regard, the radiator shroud 60 is of generally rectangular shaped configuration and includes spaced apart substantially vertical walls 51, a top wall 62 and a bottom wall 63. The vertical walls 61 are provided with inturned flanges 64 which are apertured to receive the bolts 47 therethrough. Nuts 48 engage the threaded ends of the bolts 47 and secure the modules and radiator shroud in mounted relation on the rear grill housing 15.

Each radiator module 40 is provided with an inlet fitting 49 and an outlet fitting 50 through which the coolant passes. A flexible conduit 51 interconnects the engine block 24 with a manifold pipe provided with a plurality of fittings 53. The manifold fittings 53 are each connected to an end of one of a plurality of conduits 54, the other end of each conduit 54 being connected to the inlet fitting 49 of certain radiator modules. It will be seen that the outlet fittings 50 of certain of the radiator modules are connected to the inlet fitting of the adjacent radiator modules by connector conduits 51a. It will be noted that each pair of radiator modules is arranged one above the other so that the inlet and outlet fittings thereof are disposed in adjacent relationship. It will also be noted that the outlet fittings 50 of the lowermost pair of radiator modules are connected by conduits 55 to fittings 56 on the reservoir tank 36. It will further be noted that reservoir tank 36 is provided with a conventional filler cap 57 to permit coolant to be introduced thereto.

From the foregoing description, it will be seen that the heated coolant is directed from the cooling block 24 of the engine 23 through the conduit 51 and thereafter through the radiator modules 50. The coolant is cooled as it is circulated through the modules and the cooled coolant is then directed into the reservoir tank 36. Thereafter, the cooled coolant is returned through the conduit 38 to the cooling block 24 of the engine 23.

Thus, the radiator system 39 functions in the manner of the conventional radiator system. However, it will be noted that radiator modules 40 may be added or removed in accordance with the cooling requirement resulting from the operation of the vehicle 10. Although four such modules are shown, more of these modules may be added or removed as desired. In the event that the front-end loader 10 is operated in an extremely hot environment such as a foundry during the summer months, then it will be necessary to have a radiator system with a relatively large cooling capacity. Conversely, if the front-end loader is being operated in the northern climates during the winter time, the cooling requirements to operate the engine efficiently will be comparatively lower. Therefore the number of radiator modules will be reduced.

When it is desirable to add or remove the radiator modules, it is only necessary to first swing the rear grill housing 15 to the open position and thereafter unbolt the number of modules to be removed. On the other hand, if it is desirable to add radiator modules, it is only necessary to again arrange the modules in stacked, superimposed position and mount the modules on the rear grill housings. The conduits may be readily connected and disconnected from the fittings of the associated modules thereby permitting ready removal or addition of the modules with respect to the rear grill housing 15.

It will further be seen that when the rear grill housing is in the closed position, radiator shroud 60 will engage the foam gasket 35 and thereby provide improved vibration isolation of the radiator system.

It will therefore be seen from the preceding paragraphs that I have provided a novel variable capacity radiator system for off-highway vehicles which functions in a more efficient manner than heretofore known comparable system.

It is anticipated that various changes can be made in the size, shape and construction of the variable capacity radiator device disclosed herein without departing from the spirit and scope of my invention as defined by the following claims.

What is claimed is:

1. A self-propelled vehicle comprising:
a body having an engine compartment,
propulsion wheels for supporting the vehicle for travel, an internal combustion engine in said engine compartment for propelling said ground-engaging wheels, said engine being cooled during operation thereof by a liquid coolant,
a vertically disposed perforated grill housing hingedly mounted on said body for swinging movement relative thereto about a vertical axis between open and closed positions with respect to said engine compartment,
a reservoir tank mounted on the vehicle body and connected to said engine for returning cooled coolant to said engine, said reservoir tank being spaced from said grill housing,
a variable capacity radiator system for cooling heated coolant comprising a plurality of similar cooling modules, means mounting the modules in stacked relation interiorly of the rear grill housing, conduit means connecting the radiator modules with each other and with said engine to receive said coolant from the latter, conduit means interconnecting certain modules with said reservoir tank to direct cooled coolant to the reservoir tank, said module mounting means being effective for permitting ready removal or addition of radiator modules for mounted relation on the rear grill housing to thereby selectively vary the cooling capacity of the radiator system,
an annular yieldable member mounted on the vehicle body and being engaged by the radiator system when the grill housing is in the closed position.

2. The self-propelled vehicle as defined in claim 1 wherein said variable capacity radiator system includes a generally rectangular shaped shroud mounted within the grill housing and extending around the periphery of the cooling modules.

3. The self-propelled vehicle as defined in claim 2 wherein said annular yieldable member is of rectangular configuration and reduces vibration of the radiator system during operation of the vehicle.

4. The self-propelled vehicle as defined in claim 1 wherein said grill housing is located at the rear of the vehicle.

5. The self-propelled vehicle as defined in claim 2 and said mounting means for said modules includes a plurality of mounting bolts on said housing and projecting therefrom, a plurality of connector elements on said modules through which said bolts project, and means engaging said bolts and said shroud to releasably secure the radiator system on the grill housing.

* * * * *